US010887082B2

(12) United States Patent
Chamarajnager et al.

(10) Patent No.: US 10,887,082 B2
(45) Date of Patent: Jan. 5, 2021

(54) INTERNET OF THINGS BLOCKCHAIN AUDITING

(71) Applicant: VMware, Inc., Palo Alto, CA (US)

(72) Inventors: Ravishankar Chamarajnager, Atlanta, GA (US); Devanand Kondur, Alpharetta, GA (US); Vasudev Yendapally, Alpharetta, GA (US); Niranjan Maka, Union City, CA (US)

(73) Assignee: VMWARE, INC., Palo Alto, CA (US)

( * ) Notice: Subject to any disclaimer, the term of this patent is extended or adjusted under 35 U.S.C. 154(b) by 219 days.

(21) Appl. No.: 16/043,420

(22) Filed: Jul. 24, 2018

(65) Prior Publication Data
US 2020/0034454 A1 Jan. 30, 2020

(51) Int. Cl.
*H04L 29/06* (2006.01)
*H04L 9/06* (2006.01)
*H04L 9/32* (2006.01)
(52) U.S. Cl.
CPC .......... *H04L 9/0637* (2013.01); *H04L 9/0643* (2013.01); *H04L 9/3265* (2013.01)
(58) Field of Classification Search
CPC .................................................... H04L 9/0637
See application file for complete search history.

(56) References Cited

U.S. PATENT DOCUMENTS

| 2017/0046652 A1* | 2/2017 | Haldenby | G06Q 20/065 |
| 2017/0232300 A1* | 8/2017 | Tran | H04L 69/40 |
| | | | 434/247 |
| 2017/0238072 A1* | 8/2017 | MacKie | G01F 1/075 |
| | | | 340/870.03 |
| 2017/0262862 A1 | 9/2017 | Aljawhari | |
| 2018/0078843 A1* | 3/2018 | Tran | A61B 5/6803 |
| 2018/0117447 A1* | 5/2018 | Tran | G01L 1/00 |
| 2018/0137457 A1* | 5/2018 | Sachs | G06Q 30/0277 |
| 2018/0139056 A1* | 5/2018 | Imai | H04L 9/3236 |
| 2018/0188715 A1 | 7/2018 | Cella et al. | |
| 2018/0302222 A1* | 10/2018 | Agrawal | H04W 4/70 |

(Continued)

FOREIGN PATENT DOCUMENTS

| KR | 101678795 B1 | 11/2016 |
| WO | 2017187397 A1 | 11/2017 |

OTHER PUBLICATIONS

International search Report mailed for Application No. PCT/US2019/043111.

*Primary Examiner* — Bradley W Holder
(74) *Attorney, Agent, or Firm* — Thomas Horstemeyer, LLP

(57) ABSTRACT

Disclosed are various examples of utilizing blockchain for tracking and auditing of systems and processes that involve Internet-of-Things (IoT) devices. In one example, an IoT event definition is installed on a gateway. The IoT event definition includes a threshold value associated with an asset type. The gateway receives sensor data from an IoT device associated with the asset type. The gateway determines that the IoT device triggered an IoT event based on the sensor data and the IoT event definition. The sensor data indicates that the IoT device triggered the IoT event based on the threshold value. The gateway transmits, to a management service, a request to record an IoT event to a blockchain. The request includes the sensor data. A block that includes the sensor data is recorded to the blockchain.

20 Claims, 5 Drawing Sheets

(56) References Cited

U.S. PATENT DOCUMENTS

| | | | | |
|---|---|---|---|---|
| 2018/0330348 A1* | 11/2018 | Uhr | .................... | G06Q 20/102 |
| 2018/0330349 A1* | 11/2018 | Uhr | .................... | G06Q 20/3827 |
| 2018/0337769 A1* | 11/2018 | Gleichauf | ............ | G06Q 20/065 |
| 2018/0359095 A1* | 12/2018 | Asati | .................... | H04L 9/3239 |
| 2019/0013948 A1* | 1/2019 | Mercuri | ................ | H04L 9/3239 |

* cited by examiner

INTERNET OF THINGS BLOCKCHAIN AUDITING

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting client devices, IoT devices, as well as email, corporate documents, and other enterprise data from theft, data loss, and unauthorized access.

Items and other assets that are utilized in enterprise processes, transactions, or other activities can be tracked to ensure security and accuracy of the activities. The assets can be involved in actions and duties performed by multiple enterprises. One tracking and auditing solution is for each enterprise to keep a record of certain information pertaining to assets and activities. However, this solution poses a number of issues. An enterprise may not have access to records related to the assets and activities when in the care of another party or enterprise. Also, an enterprise may not trust or rely on a record that is maintained by another party or enterprise. Current solutions do not ensure that relevant asset and activity information is verifiable by each enterprise, or ensure that a record of the relevant information is not altered or falsified.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
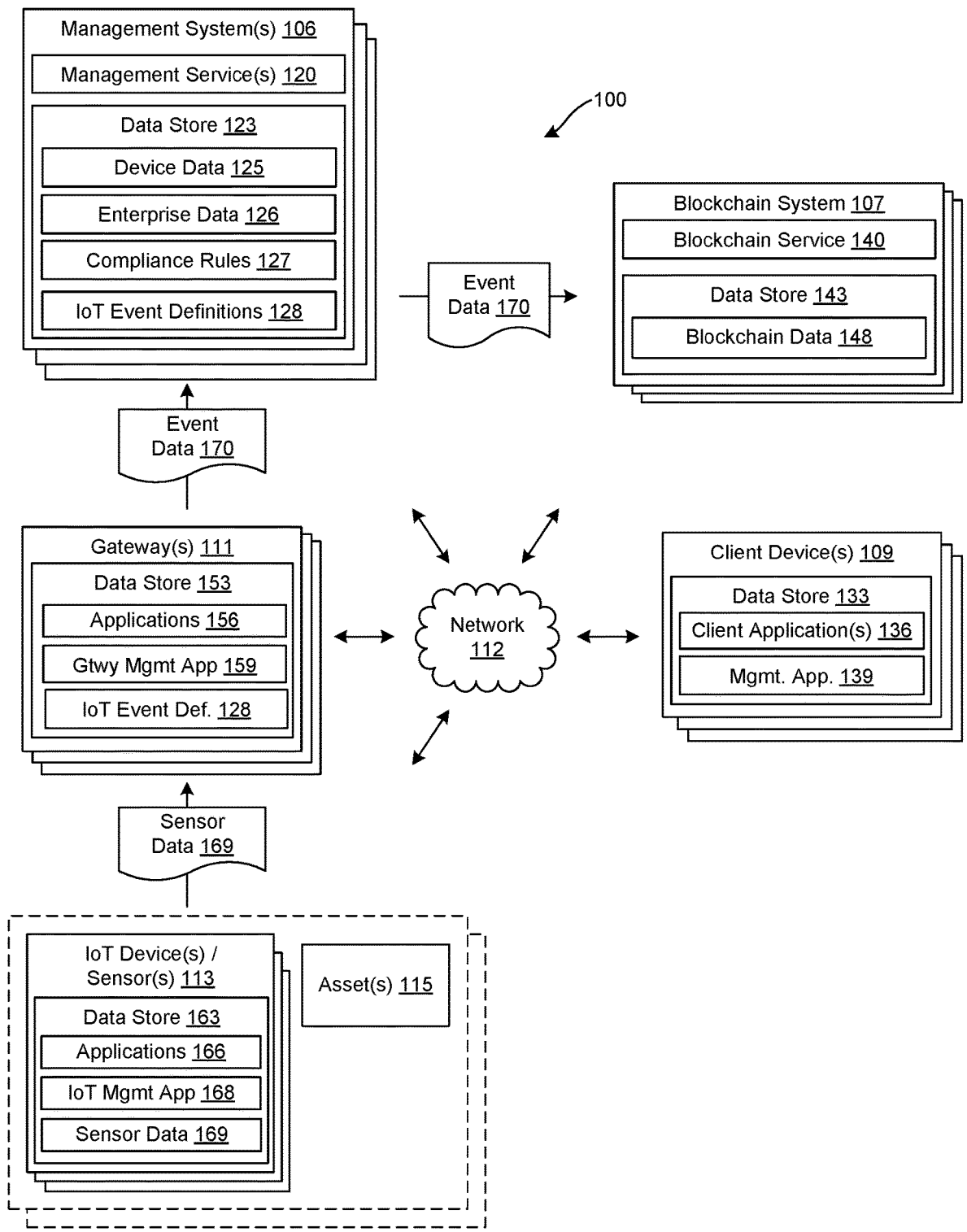
FIG. 1 is a drawing of an example of a networked environment that includes elements involved in blockchain auditing.

The present disclosure relates to utilizing blockchain for tracking and auditing of systems and processes that involve Internet-of-Things (IoT) devices or sensors. The IoT devices can generate and report data associated with items, processes, and transactions that involve multiple enterprises. This data can include warranty information, metrics, events, and milestones, as well as health of the IoT devices themselves. Current solutions do not provide a platform that tracks relevant data independent of the various enterprises as a source of truth does not exist since there is a reliance on disparate systems for various enterprises. The present disclosure describes IoT blockchain auditing systems and processes. These systems and processes can increase efficiency for enterprises to create and maintain a secure ledger of IoT data. Maintaining a ledger of measured IoT data in a blockchain format can ensure the credibility of records for enterprise or multi-enterprise activities.

Blockchain can refer to a distributed database or ledger of data that includes records that can be referred to as blocks. Each time the database or ledger is updated or changed, the update or change is recorded in an encrypted block and added to the blockchain. Each block is preserved in the blockchain so that it cannot be altered or edited. While the database or data itself can be changed or updated by adding a block to the blockchain, each change durably persists or is preserved through the blocks of the blockchain. In this way, the initial version of the data of the database or ledger is linked to the latest version of the data. While each update or change can be viewed by those with access to the blockchain, contributions can be limited to changing the latest version of the data by adding a new block. The blockchain can also be distributed across multiple nodes of a blockchain network so that the blockchain and changes to the blockchain can be verified by other nodes.

In the example of a supply chain for a particular product, item or other asset, it can be required to comply with government regulations, industry standards, or an agreement or contract between parties. In food industry, regulatory bodies can audit and enforce regulatory compliance of domestic firms and the foods they produce. Audits can check for improper holding temperatures, freeze temperatures, and chill temperatures. The particular asset can be required to be within predetermined moisture and temperature ranges defined by predetermined moisture and temperature thresholds. An IoT temperature sensor can be packaged with, attached to, or otherwise physically associated with the asset. Likewise, an IoT moisture sensor can be physically associated with the asset. The IoT sensors can report to a management service through a gateway. The management service can post sensor data periodically, and/or in response to a violation of the predetermined ranges for moisture and temperature. A violation of the predetermined ranges can be considered an IoT event, in that IoT sensor data can be compared to IoT event definitions 128 stored by the management service to identify that the IoT event has occurred.

A record can also include data relevant to warranty tracking and history for parts. In addition to tracking warranty information of all the parts, a manufacturing process in an assembly plant can be physically tracked so each part can be traced back to how long it was sitting on a shelf and transit times between locations. Events can also be dependent upon time, location, or other factors that can be measured by IoT device sensors. An IoT event can be triggered based on a geolocation sensor for an asset being outside of a predefined perimeter, or being beyond a threshold distance from a predefined location. An IoT event can be triggered based on a motion sensor or impact sensor being activated or being beyond a motion or impact threshold. The sensor data can be time-correlated, and the IoT event definition can specify an IoT event based on sensor data indicating, for a threshold period of time, a particular comparative relation with a threshold value. A comparative relation can include greater than, less than, equal to. Multiple sensors can be involved in an IoT event. For example, a Boolean expression or relationship can be defined with states or thresholds for each of a plurality of IoT devices or sensors. In addition, an asset may be required to be in the predefined location at a predefined time or within a predefined time period. This can enable tracking of parts and warranty information to make the supply chain more efficient as bottlenecks can be identified and warranty information for each product can be immediately accessed. A blockchain record can be shared with supply chain partners, manufacturers, and regulators in a secure way.

In some embodiments, IoT sensor data can be received from a gateway. The IoT sensor data can be accepted based on an authentication of the gateway with a management service. Authentication of the gateway with the management service is based on gateway credentials that are concealed from users during a gateway enrollment process. In some situations, a command queue associated with the gateway can be updated to include a command to obtain the IoT sensor data from an IoT sensor. The command queue can be updated based on a predetermined schedule, or periodically. The IoT sensor data can be determined or identified as associated with an IoT event by a comparison of the IoT sensor data with a threshold value. The threshold value can be associated with from an IoT event definition in a data store of the management service. Permission to update a blockchain can be established based on an authentication of the management service with a blockchain service. Authentication of the management service with the blockchain service can be based on a certificate uniquely associated with the enterprise. The blockchain service can host the blockchain in a plurality of nodes. In some cases, each node can be external to the computing device. The blockchain can be updated to include an encrypted block that includes the IoT sensor data.

In some embodiments, an IoT event definition can be installed to a gateway device. The IoT event definition can include a threshold value associated with an asset type. In some cases, the IoT event definition can be retrieved from a command queue for the gateway device, which can be stored by the management service. Sensor data can be received from an IoT device associated with the asset type. The gateway can determine that the IoT device triggered an IoT event based on the sensor data and the IoT event definition. The sensor data can indicate that the IoT device triggered the IoT event based on the threshold value. The gateway can transmit, to a management service, a request to record an IoT event to a blockchain. The request can include the sensor data indicating that the IoT device triggered the IoT event. The management service can record a block to the blockchain. The block can include the sensor data. The blockchain can be hosted by a blockchain service in a plurality of nodes external to a plurality of management services includes the management service. In other cases, the blockchain can be hosted in a plurality of nodes corresponding to a plurality of management services, which can include the management service.

The management service can authenticate with the blockchain service based on a certificate uniquely associated with an enterprise. The gateway device can include gateway credentials that are concealed from users during a gateway enrollment. The gateway device can authenticate with the management service based on the gateway credentials. In some examples, IoT event data including the sensor data and metadata can be generated. The metadata can identify an entity responsible for a particular asset. The particular asset can be physically associated with the IoT device. The request to record the IoT event can include the IoT event data. The IoT event definition can specify a threshold period of time to maintain a particular comparative relationship with the threshold value, and the sensor data can indicate that a sensor maintains the particular comparative relationship with the threshold value for the threshold period of time.

In some embodiments, a management service can cause an IoT event definition to be installed in a gateway device. The IoT event definition can include a threshold value associated with a type of asset. A request to record an IoT event to a blockchain can be received from a gateway device. The request can include sensor data that indicates that an IoT device triggered the IoT event based on the threshold value. In some cases, the IoT event definition can specify a threshold period of time to maintain a particular comparative relationship with the threshold value, and the sensor data can indicate that a sensor maintains the particular comparative relationship with the threshold value for the threshold period of time. A block for the blockchain can be generated. The block can include a description of the IoT event. The description can include the sensor data. The block can be an encrypted block. The block can be recorded to the blockchain. A blockchain service can permit the management service to record the block to the blockchain based on an authentication of the management service with the blockchain service.

The blockchain can be retrieved from the blockchain service, and a user interface can be generated. The user interface can include a summary of IoT events that can be based on the blockchain. In some cases, a plurality of blockchains can be retrieved, and a user interface including a summary of IoT events can be based on the plurality of blockchains.

With reference to FIG. 1, shown is an example of a networked environment 100. The networked environment 100 can include a management system 106, a blockchain system 107 client device 109, a gateway 111, Internet-of-Things (IoT) devices 113, and other components in communication with one another over a network 112. Internet-of-Things (IoT) devices 113 and other managed devices can connect to the network 112 through the gateway 111. The components of the networked environment 100 can be utilized to enable blockchain auditing of systems and processes that involve Internet-of-Things (IoT) devices or sensors.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 106 can include a server computer or any other system providing computing capability. While referred to in the singular, the management system 106 can include a plurality of computing devices that are arranged in one or more server banks, computer banks, or other arrangements. The management system 106 can include a grid computing resource or any other distributed computing arrangement. The management system 106 can be customer or enterprise-specific. In some embodiments, the management system can be part of a local network and can be local to at least one of the other components of the networked environment. In other embodiments, the management system 106 can be remote from the other components, or the computing devices of the management system 106 can be located in a single installation or can be distributed among many different geographical locations local and/or remote from the other components. The management system 106 can also include or be operated as one or more virtualized computer instances. For purposes of convenience, the management system 106 is referred to herein in the singular. Even though the management system 106 is referred to in the singular, it is understood that a plurality of management systems 106 can be employed in the various arrangements as described above.

The components executed on the management system 106 can include a management service 120 as well as other applications, services, processes, systems, engines, or functionality not discussed in detail herein. The management service 120 can be stored in the data store 123 of the management system 106. The data store 123 can include any storage device or medium that can contain, store, or maintain the instructions, logic, or applications described herein for use by or in connection with the instruction execution system. The data store 123 can include a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 106, mass storage resources of the management system 106, or any other storage resources on which data can be stored by the management system 106. The data stored in the data store 123 can include, for example, management data including device data 125, enterprise data 126, compliance rules 127, and IoT event definitions 128, as well as other data.

The data stored in the data store 123 can be associated with the operation of the various applications and/or functional entities described. Client devices 109, gateways 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices. The device data 125 can include gateway data associated with gateways 111 and other edge systems or edge devices through which IoT devices 113 can connect to the network 112. The gateway data can also include specifications, and for each gateway 111, a type of gateway or a gateway identifier, and other information. Specifications for the gateway 111 can include hardware configurations including a chipset utilized by the gateway, a performance or capacity, a model identifier, and software configurations, including an agent application installed on the gateway 111. For example, the configuration can identify an agent such as the gateway enrollment agent 118, the gateway management application 159, or a version of the gateway enrollment agent 118 or the gateway management application 159. The gateway data can also include an organizational group.

Device data 125 can include data associated with a configuration of each client device 109, gateway 111, and IoT device 113, and can include an identifier of the client device 109, gateway 111, or IoT device 113. In some cases an IoT device 113 can include multiple sensors. The identifier can be a serial number, media access control (MAC) address, other network address, or another device identifier. In addition, the device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 126, while a client device 109, gateway 111, or IoT device 113 designated as "not enrolled," or having no designation, can be denied access to the enterprise data 126.

Device data 125 can include credentials associated with user accounts of the management service 120. The credentials can permit communications with the management service 120. Similarly, gateway credentials can be credentials associated with gateway accounts and can enable or permit communications with the management service 120. The credentials are provided for authentication with the management service 120 for management and IoT operations. In some situations, gateway credentials are concealed from users or not provided to any user during the enrollment process. The credentials can include one or more of a username, a password, an HMAC token, and/or a certificate, for authentication.

Additionally, device data 125 can include indications of the state of devices including the client devices 109, gateways 111, and IoT devices 113. For instance, these indications can specify applications that are installed on the client devices 109, gateways 111, and IoT devices 113; configurations or settings that are applied to each of the devices, user accounts, gateway accounts, or service accounts associated with each of the devices; the physical locations of each of the devices; the network to which each of the devices is connected; and other information describing the current state of each of the devices. While a user account can be associated with a particular person, in some cases a user account can be unassociated with any particular person, and can nevertheless be utilized for client devices 109, gateways 111, or IoT devices 113 that provide certain functionalities, such as automatic functionalities. For example, a gateway 111 can be associated with a service account or a gateway account that is unassociated with any person.

Device data 125 can also include data pertaining to user groups. An administrator can specify one or more of the client devices 109, gateways 111, and IoT devices 113 as belonging to a user group. The user group can refer to a group of user accounts, which can include gateway accounts. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department. Device data 125 can include data associated with a gateway account or user account.

Compliance rules 127 can include, for example, configurable criteria that must be satisfied for an enrolled one of the client devices 109, gateways 111, and IoT devices 113 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules 127 can also be determined based on a user account associated with a user. In some cases, a gateway 111 can be unassociated with a user, but can nevertheless be associated with a service account, a gateway account, or another user account that is unassociated with a user.

Compliance rules 127 can include predefined constraints that must be met in order for the management service 120, or other applications, to permit access to the enterprise data 126. The management service 120 can communicate with management application 139, gateway management application 159, IoT management application 168, or other applications to determine whether states exist on the client device 109, gateway 111, or IoT device 113, that do not satisfy one or more compliance rules 127. States can include, for example, a virus or malware being detected on the device; installation or execution of a blacklisted application; and a device being "rooted" or "jailbroken," where root access is provided to a user of the device. Additional states can include the presence of particular files, questionable device configurations, vulnerable versions of applications, vulnerable states of devices, or other vulnerability, as can be appreciated.

The management service 120 can communicate with the gateway 111 to determine whether states exist that do not satisfy one or more compliance rules 127 regarding the gateway 111 and IoT devices 113. The gateway management application 159 can receive IoT device 113 communications, for example from the IoT management application 168. The IoT device 113 communications can include status data for the IoT device 113. The gateway management application 159 can pass or otherwise transmit the status data to the management service 120 for evaluation of the compliance rules 127. The management service 120 can also transmit all or a portion of the compliance rules 127 to the gateway 111. The gateway 111 can store the compliance rules 127 in the data store 123. The gateway 111 can then determine or evaluate whether states exist, for example on the IoT devices 113, that do not satisfy one or more compliance rules 127, for example, without passing or transmitting the status data to the management service 120. In any case, determining that states exist in the IoT device 113 that do not satisfy one or more compliance rules 127 can trigger an action or command that causes the IoT device 113 to be in compliance with the compliance rules 127. In some examples, the compliance rules 127 include one or more commands that bring the IoT device 113 into compliance.

IoT event definitions 128 can include rules that indicate when event data 170 should be written to the blockchain data 148. The IoT event definitions 128 can specify IoT events for a particular asset 115 or type of asset 115, as well as for a particular IoT device 113 or type of IoT device. A type of an IoT device 113 can correspond to a type of asset 115. Each asset 115 can be associated with an IoT device 113 or multiple IoT devices 113. In some cases, the corresponding IoT devices 113 can be attached to, or otherwise physically associated with the asset 115. The IoT devices 113 can also be logically associated with the asset 115 in the data store of the management service 120. An IoT event can be defined by predefined time-correlated sensor values and other sensor data 169 associated with a particular one of the IoT devices 113 for the asset 115. A location can be defined by a virtual geographic boundary, perimeter, or geofence using GPS, RFID, or other geolocation sensors. A location can also be defined by a specified threshold distance from a particular geolocation specified, for example, using latitude and longitude or another manner. The management service 120 can compare the predefined location to sensor data 169 in the IoT event definitions 128 to determine that an IoT event has occurred that is to be written to the blockchain data 148. The predefined location can include a corresponding time, and the sensor data 169 can also include a corresponding time. Sensor values can include a predefined maximum threshold sensor value and a minimum threshold sensor value for a particular IoT device 113, or a threshold distance from a predefined sensor value. The management service 120 can compare the predefined sensor values to sensor data 169 in the IoT event definitions 128 to determine that an IoT event has occurred that is to be written to the blockchain data 148.

The predefined sensor values can include a corresponding time, and the sensor data 169 can also include time values. A predefined threshold sensor value can include a predefined threshold time value. The predefined time value can be associated with a predefined sensor value. For example, the predefined time value can include a maximum or minimum time period that a sensor can remain in a particular location, or a maximum or minimum time period for a sensor to travel from a first location to a second location. Maximum travel or location times can help identify reasons for delays in a supply chain or manufacturing process. Minimum times can ensure quality of goods. For example, cold goods can be required to remain in a location associated with a cooler for a minimum time to ensure the internal temperature of the item. Time-based predefined threshold sensor values can also include maximum or minimum time period for that a sensor is permitted to be above or below a threshold IoT sensor value such as a temperature value, a location value, a velocity value, an azimuthal angle value, an elevation angle value, an acceleration value, a moisture value, a radiation value, a biometric value, or a barometric pressure value.

The blockchain system 107 can include a server computer or any other system providing computing capability. While referred to in the singular, the blockchain system 107 can include a plurality of computing devices that are arranged in one or more server banks or computer banks in a plurality of nodes that host the blockchain data 148 in multiple data stores 143 corresponding to each node. The blockchain system 107 can include a grid computing resource or any other distributed computing arrangement. Storage of the blockchain data 148 in multiple nodes can provide a consensus that verifies content of the blockchain data 148 and ensures the accuracy and security of the data. In other embodiments, the blockchain system 107 can be remote from the other components, or the computing devices of the blockchain system 107 can be located in a single installation or can be distributed among many different geographical locations local and/or remote from the other components. The blockchain system 107 can also include or be operated as one or more virtualized computer instances. For purposes of convenience, the blockchain system 107 can be referred to in the singular. Even though the blockchain system 107 is referred to in the singular, it is understood that a plurality of nodes can be included in multiple systems and can be employed in the various arrangements as described above. In some embodiments, the blockchain system 107 can be independent from the management systems 106 and corresponding enterprises. In other embodiments, the blockchain system 107 can involve a combination of multiple management systems 106, each associated with a corresponding enterprise.

The components executed on the blockchain system 107 can include a blockchain service 140 as well as other applications, services, processes, systems, engines, or functionality not discussed in detail herein. The blockchain service 140 can require a management service 120 to authenticate with the blockchain service 140 establish permission to write to the blockchain data 148. In some cases, the management service 120 can authenticate with the blockchain service 140 based on credentials that can include a username, password, file, token, or certificate. The credentials can be uniquely associated with an enterprise, or with the management service 120.

The management service 120 can oversee the management of devices including the client devices 109, gateways 111, and IoT devices 113. The management service 120 can oversee the operation of the devices enrolled with the management service 120 as well as manage enrollment and un-enrollment operations for the devices. The management service 120 can provide functionality using application program interfaces (APIs). To this end, an API of the management service 120 can provide enrollment information regarding a device, such as whether the device is enrolled with the management service 120. APIs or API calls can be provided for other functionalities of the new management service 120 as discussed herein.

In some embodiments, an enterprise, such as one or more companies or other organizations, can operate the management service 120 to oversee or manage the operation of the client devices 109 of its employees, contractors, customers, students, or other users having user accounts with the enterprise. The enterprise can also operate the management service 120 to oversee or manage the operation of the gateways 111 associated with the enterprise, as well as devices that connect to the network 112 through the gateways 111, including IoT devices 113. An enterprise can be a customer of the management service 120. The management service 120 can remotely configure the client device 109 by interacting with an agent application, a management application 139, or another application 136 executed on the client device 109. Likewise, the management service 120 can remotely configure the gateway 111 by interacting with an agent application, gateway management application 159, or another application executed on the gateway 111. The gateway management application 159 can include a number of components including an IoT Agent for management and communication with IoT devices 113.

The management service 120 can transmit various software components to the client device 109 which are then installed, configured, or implemented by the management application 139. Such software components can include, for example, additional applications 136, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the management application 139.

Likewise, the management service 120 can transmit various software components to the gateway 111 which are then installed, configured, or implemented by the gateway management application 159. Such software components can include, for example, additional client applications, resources, libraries, drivers, device configurations, or other similar components that require installation on the gateway 111 as specified by the enterprise or an administrator of the management service 120. The management service 120 can further cause policies to be implemented on a gateway 111. Policies can include, for example, restrictions or permissions pertaining to capabilities of a gateway 111. For instance, policies can require certain hardware or software functions of the gateway 111 to be enabled or be disabled during a certain time period or based on a particular location. Such policies can be implemented by the gateway management application 159.

The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management application 159. In some cases, the gateway 111 can store an IoT device identifier uniquely associated with the IoT device 113 as part of the enrollment process for the IoT device 113. The gateway 111 can establish trust with the IoT device 113 by checking that the IoT device identifier or other credentials such as a username, password, token, or certificate is in a table, list, or database of enrolled and trusted IoT devices 113 to allow the IoT device 113 to provide sensor data 169 to the gateway 111 or to the management service 120, through the gateway 111. In some cases, the IoT device 113 can provide the IoT device identifier or other credentials such as a username, password, token, or certificate uniquely associated with the IoT device 113.

The management service 120 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The management service 120 can also include an analytics service that provides real-time infrastructure analytics for the gateway 111, other edge devices, and IoT devices 113. The analytics can be generated based on IoT sensor data 169 provided from the gateway 111 or other edge devices. The gateway 111 can provide event data 170 and/or sensor data 169 based on IoT device 113 communications with the gateway 111. The IoT Center 121 can also provide or utilize the command queue and notification services as discussed above regarding the management service 120, for instance, to in order to provide over-the-air software and policy updates for the gateway 111, other edge devices, and IoT devices 113.

The management service 120 can also transmit various software components to the IoT device 113 which are then installed, configured, or implemented by the IoT management application 168. Such software components can include, for example, additional applications 166, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location.

These policies can be implemented by the IoT management application 168. The management service 120 can transmit the software components to the IoT device 113 through the gateway 111. The management service 120 can have a command queue storing at least one action to perform on the particular gateway 111 upon check-in of the gateway 111. For instance, the gateway management application 159 can cause the gateway 111 to check-in with the management service 120, identify an action in the command queue, and perform or implement the action. An action can be the installation of a profile, or the execution of a command or other actions to install software components, implement policies, update the gateway management application 159, install a software product, or implement other commands. In some cases, the gateway management application 159 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113. In one example, the contents of the command queue can include a command that the gateway management application 159 cause to be executed on the gateway 111. In another example, the contents of the command queue can include a resource, an application, or an application update that the gateway management application 159 causes to be installed on the gateway 111, which the gateway can access through a specified uniform resource locator (URL) in the command. A client device 109 can likewise be associated with a command queue and can retrieve and implement commands.

The management service 120 can also request that the IoT device 113, gateway 111, or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the IoT device 113 check-in with the management service 120. The notification service can push or otherwise route a notification to the IoT device 113. Once the notification is received, the IoT management application 168 can cause the IoT device 113 to check-in with the management service 120 or gateway 111. The IoT management application 168 can determine whether a command queue for the IoT device 113 contains any commands or resources, and if so, can cause the commands or resources to be downloaded and/or implemented on the IoT device 113. A gateway 111 or client device 109 can likewise be associated with a command queue and can retrieve and implement commands in response to a request from a notification service. Where the gateway 111 maintains the command queue for the IoT device 113, the gateway 111 can retrieve a command from the management service 120 and can place a command or resource in the command queue for the IoT device 113.

An IoT Center of the management service 120 can oversee management of gateways 111, which can include routers, routing switches, integrated access devices (IADs), multiplexers, a variety of metropolitan area network (MAN) and wide area network (WAN) access devices, and other edge devices. The management service 120 can also oversee management of IoT devices 113 that are connected through the edge devices. The management service 120 can generate and provide an administrative console or user interface for management of the gateway 111, other edge devices, and IoT devices 113 that are connected through the edge devices. The user interface of the Management service 120 can be accessed through management application 139 or another application 136 of a client device 109, or can be accessed through a network site provided by the management service 120 or the management service 120. The management service 120 can provide a user interface for setting and viewing alerts and notifications. The alerts and notifications can also be sent to a particular email address or to a particular client device 109.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 133 that also includes client applications 136, a management application 139, and other data. The client device 109 can execute the management application 139 to perform or access the functionality described for the management system 106.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 136, such as a management application 139, a management application 139, or another application. The operating system and some applications 136 can access network content served up by the management system 106, or other servers, thereby rendering a user interface on a display, such as a liquid crystal display (LCD), organic light emitting diode (OLED) display, touch-screen display, or other type of display device.

To this end, some applications 136 can include a browser or a dedicated application, and a user interface can include a network page, an application screen, or other interface. The client device 109 can also access web applications using the browser application. Further, other applications 136 can include device management applications, enterprise applications, social networking applications, word processors, spreadsheet applications, media player applications, or other applications. The management application 139 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute gateway management application 159 and other applications 156 and modules stored in the data store 153. The gateway management application 159 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111. The gateway 111 can provide network 112 access to the IoT devices 113, as well as implement enrollment processes and gather IoT sensor data and metrics data based on IoT device 113 communications with the gateway 111.

The gateway management application 159 can be an agent, an application, or other instructions executable by the gateway 111. The gateway management application 159 can facilitate communications between the gateway 111 and the management service 120 and can implement actions on the gateway 111. The actions can be retrieved from a command queue of the management service 120. To this end, the gateway management application 159 can communicate with the management service 120, for example, through an enrollment endpoint of the management service 120 or an address associated with the management service 120.

The IoT device 113 can be representative of one or more IoT devices 113. The IoT device 113 can include a single sensor or multiple sensors. The IoT device 113 can include appliances, vehicles, sensors, controllers, actuators, monitors, phones, tablets, thermostats, speakers, printers, locks, and other devices and can incorporate processor-based systems that can include a processor, network communication hardware, and a memory including executable instructions, such as a computer system or any other device with like capability. The IoT device 113 can have an operating system or other software that can perform functionalities and execute applications. The operating system can be stored in a data store 163 that also includes applications 166, an IoT management application 168, and other data. The IoT device 113 can execute the IoT management application 168 to perform or access the functionality described for the management system 106, including the management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some situations, the IoT device 113 can be a thermostat, fixture, or other device that is not easily portable. In other embodiments, the IoT device 113 is mobile where the IoT device 113 is easily portable from one location to another.

One or more IoT devices 113 can be attached, connected, or otherwise physically associated with an asset 115 for tracking of sensor data 169. For example, the IoT devices 113 can include temperature sensors, moisture sensors, barometric pressure sensors, GPS, or other geolocation sensors, accelerometers, angle sensors, velocity sensors, impact sensors, infrared sensors, radiation sensors, biometric sensors, and others. The IoT devices 113 can also track time, date, and other metrics. The sensor data 169 can include any of the metrics tracked by the IoT devices 113, including temperature, moisture, radiation, impact force, location, velocity, azimuthal angle, elevation angle, barometric pressure, time, date, biometric scans, and other data that is gathered, generated, tracked, or reported by the IoT devices 113. The sensor data 169 can be stored in the data store 163 and can be transmitted to the gateway 111. The sensor data 169 can also be transmitted through the gateway 111 to the management service 120. The management service 120 can evaluate the data in view of the IoT event definitions 128, and include the sensor data 169 in the event data 170 that it writes to the blockchain data 148.

The IoT management application 168 can perform actions as directed by the management service 120 and/or the gateway 111. The gateway management application 159 and/or the management service 120 can maintain a command queue for the IoT device 113. The command queue for the IoT device 113 can include actions and commands as discussed. The gateway management application 159 can determine whether states exist on the IoT device 113 that violate one or more of the compliance rules 127 based on status data received from the IoT device 113 or pass status data received from the IoT device 113 to the management service 120 to perform the evaluation. If the IoT device 113 is not in compliance, the gateway management application 159 or the management service 120 can place a command to bring the IoT device 113 into compliance in a command queue for the IoT device 113. The IoT management application 168 can retrieve the command to bring the IoT device 113 into compliance. The IoT management application 168 can implement the command. The management service 120 can place a command for the IoT device 113 in the command queue for the gateway 111. The gateway management application 159 can retrieve the command and place it in a command queue for the IoT device 113 that is maintained on the gateway 111.

Figure 2:
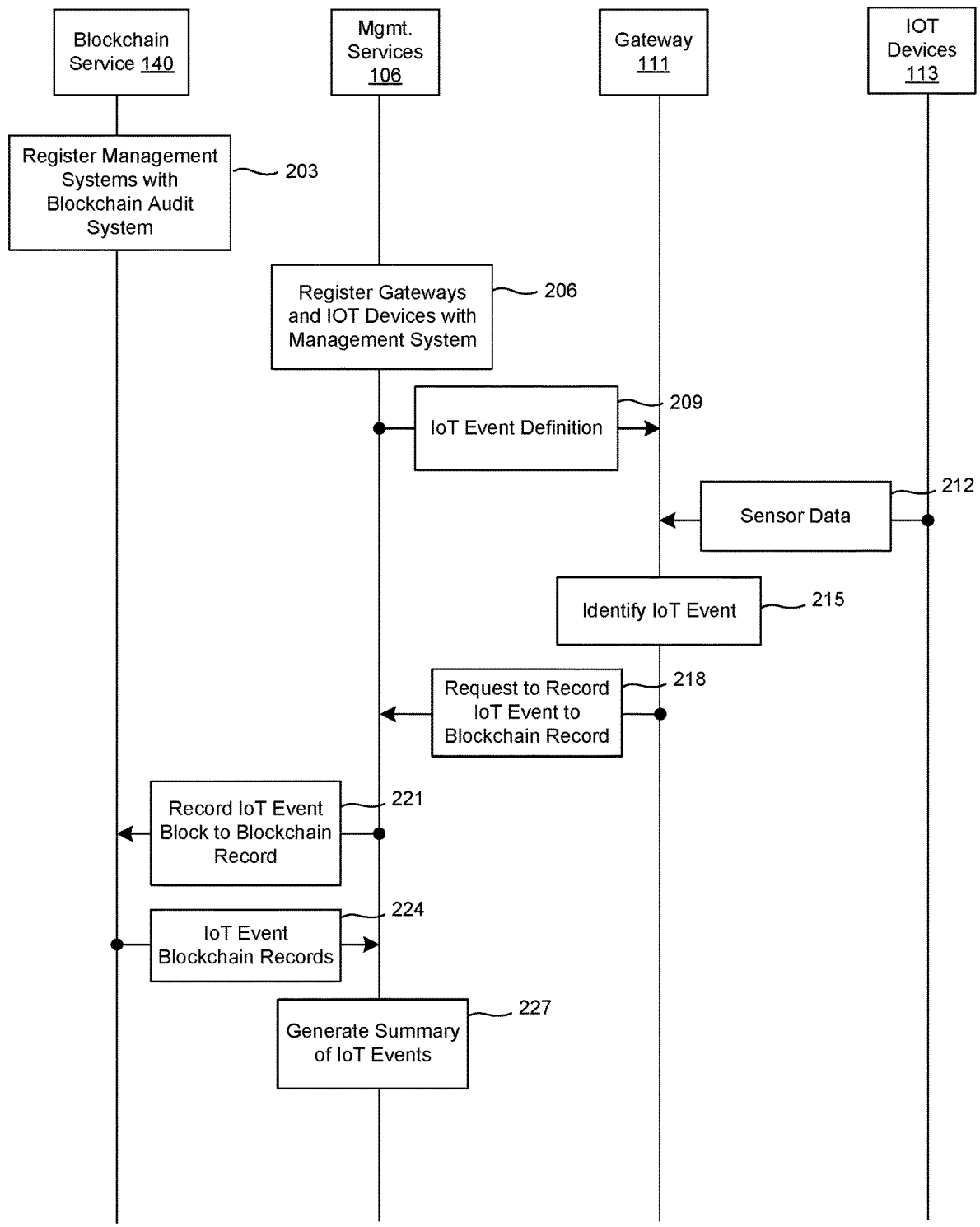
FIG. 2 is a sequence diagram that illustrates functionality implemented by components of the networked environment.

FIG. 2 illustrates a sequence diagram that illustrates functionality performed by components of the networked environment 100. Generally, this process enables the components of the networked environment 100 to record and maintain IoT events in a blockchain record stored by a blockchain service 140.

In step 203, management services 120 can be registered with the blockchain service 140. In some cases, registration can include uploading or otherwise transmitting, to the blockchain service 140, a management certificate uniquely associated with an enterprise or the management service 120. The management certificate can be a root certificate or another type of certificate. In some cases, a blockchain certificate uniquely associated with the blockchain service 140 can be provided to the management service 120. The blockchain service 140 can permit management services 120 to write blocks to blockchains in the blockchain data 148 based on authentication using the management certificate. The management services 120 can confirm that connections to the blockchain service 140 by authentication using the blockchain certificate. In some cases, the services can exchange certificates by transmitting the respective certificates during authentication.

In step 206, gateways 111 and IoT devices 113 can be registered and enrolled with the management service 120. A gateway 111 can be registered with the management service 120 by uploading, transmitting, or otherwise providing a gateway identifier to the management service 120. The gateway identifier can be assigned by a manufacturer or otherwise uniquely associated with the gateway 111. A client device 109 can transmit the gateway identifier to the management service 120. The management service 120 can, in response to receiving the gateway identifier, generate a gateway account and gateway account credentials for the gateway 111. The management service 120 can place a command to install gateway credentials in a command queue for the gateway 111.

An IoT device 113 can be registered with the management service 120 by uploading, transmitting, or otherwise providing an IoT device identifier to the management service 120. The IoT device identifier can be assigned by a manufacturer or otherwise uniquely associated with the IoT device 113. A client device 109 can transmit the IoT device identifier to the management service 120.

A gateway management application 159 can be installed on the gateway 111. The gateway management application 159 can check in with the management service 120, and can retrieve the command to install the gateway credentials. The gateway credentials can enable or permit communications with the management service 120. In some situations, gateway credentials are concealed from users or not provided to any user during the enrollment or registration process. The credentials can include one or more of a username, a password, an HMAC token, and/or a certificate, for authentication.

The management service 120 can also cause the gateway 111 to activate or enroll IoT devices 113, for example, by placing at least one command associated with an activation schedule for one or more of the IoT devices in a command queue of the gateway 111. The gateway 111 can check in with the management service 120, retrieve the command from the command queue provided by the management service 120, and implement the command using the gateway management application 159. In some cases, the gateway 111 can store an IoT device identifier uniquely associated with the IoT device 113 as part of the enrollment process for the IoT device 113.

The gateway 111 can establish trust with the IoT device 113 by checking that the IoT device identifier or other credentials such as a username, password, token, or certificate is in a table, list, or database of enrolled and trusted IoT devices 113 to allow the IoT device 113 to provide sensor data 169 to the gateway 111 or to the management service 120, through the gateway 111. In some cases, the IoT device 113 can provide the IoT device identifier or other credentials such as a username, password, token, or certificate uniquely associated with the IoT device 113.

In step 209, an IoT event definition 128 can be transmitted from the management service 120 to the gateway 111. For example, the management service 120 can place a command to install the IoT event definition 128 in a command queue for the gateway 111. The gateway management application 159 can check in and retrieve the command to install the IoT event definition 128. Once the command is retrieved, the gateway 111 can implement the command by installing or storing the IoT event definition 128 in the data store 153 of the gateway 111. The IoT event definition 128 can define an IoT event that is associated with a particular type of asset 115 or a group of assets 115. An IoT device 113 can be physically associated with an asset 115 of that asset type or group of assets. For example, the IoT device 113 can be attached to the asset or attached to packaging of the asset 115. The management service 120 can also store metadata that associates the IoT device 113 with the asset 115.

The IoT event definition 128 can include a threshold value such as a threshold sensor value or a threshold time period. The IoT event definition 128 can define an IoT event based on a particular sensor being activated or a particular sensor value being beyond a threshold. The threshold sensor values can be time-correlated, and the IoT event definition can specify an IoT event including a particular comparative relation with a threshold value for a threshold period of time. Multiple sensors can be involved in an IoT event. The IoT event definition 128 can include a Boolean expression or relationship can be defined with states or thresholds for each of a plurality of IoT devices or sensors.

For example, IoT event definition 128 can specify that an event is when both a temperature value and a moisture value are exceeded or are exceeded for a threshold period of time. The IoT event definition 128 can also indicate an event when a threshold percentage of a total number of assets exceed a threshold value. For example, a shipment can include one hundred frozen products, each having an IoT device 113 attached. An IoT event can be defined where a particular threshold percentage, such as five percent of the assets have exceeded a particular threshold temperature. The IoT event definitions 128 can also include rules for temperature, moisture, barometric pressure, GPS or other geolocation, impact, force, velocity, azimuthal angle, elevation angle, infrared detection, radiation, biometrics, and other metrics, each of which can be time-correlated, and can be considered alone and in conjunction with one another.

In step 212, sensor data 169 can be transmitted from an IoT device 113 to a gateway 111. The gateway 111 can verify that the IoT device is registered or enrolled based on data or a flag in the data store 153. The sensor data 169 can include data from one or more sensors of an IoT device 113. The sensor data 169 can also include data from one or more IoT devices 113. The sensor data 169 can include a sensor value and a type of sensor value. An identity of the IoT device 113 can also be included in the sensor data 169 and identified by the gateway 111. In some cases, the gateway 111 can maintain a log or table of sensor values, or can otherwise maintain or store at least a portion of the sensor data 169.

In some cases, the sensor data 169 can include a stream of at least one tuple comprising a number and a time stamp. The gateway 111 can include the tuple in the event data 170 that is transmitted to the management service 120. The sensor data 169 can include a sampling function which is a user defined method (udm), a sampling frequency utilized by the gateway 111 to determine when to send the sensor data 169 to the management service 120, or when to include the sensor data 169 in event data 170. For example, the sensor data 169 can specify an interval between subsequent executions of the udm and an aggregation count stating how many executions of the udm to aggregate before sending the IoT metrics data 191 to the management service 120. In some cases, the udm can include IoT event definitions 128, and can indicate when the sensor data 169 is an event to report as event data 170. The sensor data 169 can include SI units and a prefix that identifies what the numbers of the stream of sensor data 169 represent. In some cases, the IoT device 113 communications and the sensor data 169 can identify a device type and device name associated with the IoT device 113.

In step 215, the gateway 111 can analyze the sensor data 169 based on the IoT event definitions 128. Storing IoT event definitions 128 and analyzing sensor data 169 by the gateway 111 can result in reduced network traffic and reduced processing by the management service 120. In some cases, the sensor data 169 can indicate that a sensor of an IoT device 113 has triggered an IoT event based on the IoT event definitions 128. For example, the sensor data 169 can indicate a sensor value that is beyond a threshold value, or sensor values that are beyond a threshold value for a threshold period of time. The gateway 111 can determine that an IoT device 113 has triggered an IoT event. If an IoT device 113 or IoT devices 113 have triggered an IoT event, the gateway 111 can generate IoT event data 170. The event data 170 can include the sensor data 169, as well as a name or identity of the IoT event that is triggered. The event data 170 can also include an entity responsible for the asset 115. The entity can be an enterprise or an individual, internal division, department, or group within the enterprise. The gateway 111 can determine the entity responsible for the asset 115, for example, based on metadata for the asset 115 stored by the gateway 111 or the management service 120. In some cases, the responsible entity can change based on an action such as scanning a barcode entering a pin or credential, digitally signing for, or otherwise accepting responsibility for the asset 115.

An IoT event definition 128 can also define and cause a change of the responsible entity, and update the metadata stored by the gateway 111 or the management service 120. For example, the IoT event definition 128 can indicate that the asset 115 is within a geographic area associated with a particular entity, such as an enterprise or a department of an enterprise. In some examples, the gateway 111 forwards the sensor data 169 to the management service 120, and the management service 120 can determine that an IoT event has occurred based on the IoT event definitions 128, can generate the event data 170, and can update or record the event data to the blockchain.

In some cases, an IoT event can be triggered based on an error or anomaly in the sensor data 169. The gateway 111, or the management service 120, can perform anomaly detection and determine that the sensor data 169 based on anomalous data or an error. This process can prevent anomalous data from being written to the blockchain data 148. In some situations, a sensor or IoT device 113 can report sensor data 169 that triggers an IoT event based on a threshold condition. For example, the sensor data 169 can indicate a sensor value that is outside a threshold range of values, or has a particular comparative relation with a threshold value. The gateway 111 can transmit a request to the IoT device 113 provide updated sensor data 169. If the updated sensor data 169 is within the threshold range, or has a different comparative relation to the threshold value, the sensor data 169 and the IoT event can be considered anomalous. In other situations, the gateway 111 can transmit a request to another IoT device 113 provide confirmation sensor data 169. The other IoT device 113 can be a second IoT device 113 associated with the same asset 115, or can be associated with a same location, as the IoT device 113 that indicated the error condition. For some types of sensor data 169, nearby IoT devices 113 can be expected to have similar readings. Accordingly, the gateway 111 can validate or invalidate the IoT event based on the anomaly detection.

Anomaly detection can also include an analysis of a history of sensor values from the particular IoT device 113, or a group of IoT devices 113. For example, the history of sensor values can indicate a threshold rate of change that is considered normal for the particular IoT device 113 or group of IoT devices 113. A rate of change between a current sensor value and a previous sensor value can be determined, and can be compared with the threshold rate of change. The anomaly detection can validate or invalidate the IoT event based on a comparative relation. Additionally or alternatively, anomaly detection data can indicate threshold values that are considered to be within a normal or reasonable range for a particular type of sensor data 169. For example, an IoT device 113 can indicate a sensor value that is unlikely to reflect an actual sensor value that can be detected by the IoT device 113. The sensor data 169 can be compared to the normal range and validated or invalidated based on a comparative relation.

In step 218, the gateway 111 can transmit the event data 170 to the management service 120. For example, the gateway 111 can generate a request to record the event data 170 in a blockchain. The request can include the sensor data 169 and other event data 170. The gateway 111 can transmit the request to the management service 120. The management service 120 can authenticate the request based on gateway credentials for the gateway 111. In some cases, the management service 120 can also perform other actions in response to an event specified in the event data 170. For example, the event data 170 can specify an event that changes or updates a responsible entity in metadata for the asset 115.

In step 221, the management service 120 can record an IoT event block to the blockchain data 148. The management service 120 can generate an IoT event block based on the event data 170. The IoT event block can be an encrypted block that describes the IoT event and includes the IoT event data 170. The management service 120 can update a blockchain in the blockchain data 148 to include the IoT event block. The blockchain service 140 can require a management service 120 to authenticate with the blockchain service 140 establish permission to write to the blockchain data 148. In some cases, the management service 120 can authenticate with the blockchain service 140 based on credentials that can include a username, password, file, token, or certificate. For example, the blockchain service 140 can permit management services 120 to write blocks to blockchains in the blockchain data 148 based on authentication using the management certificate. The management certificate can be uniquely associated with a particular enterprise. In addition, the blockchain service 140 can store a table that associated a particular management certificate with a particular set of blockchains in the blockchain data 148. Blockchain service 140 can permit access to the particular set of blockchains based on the management certificate. The management services 120 can confirm that connections to the blockchain service 140 by authentication using the blockchain certificate. In some cases, the services can exchange certificates by transmitting the respective certificates during authentication.

In step 224, the management service 120 or multiple management services 120 can retrieve blockchain data 148 from the blockchain service 140. The blockchain service 140 can require a management service 120 to authenticate with the blockchain service 140 to establish permission to access or retrieve the blockchain data 148. The blockchain service 140 can authorize number of management services 120 to access the blockchain data 148. The management services 120 can be associated with enterprises associated with a particular asset 155 or group of assets 115, for example, enterprises that are part of a supply chain or manufacturing process of the particular asset 155 or group of assets 115. The management service 120 that retrieves the blockchain data 148 can be different from the management service that wrote a particular IoT event to the blockchain data 148. However, the persistent, encrypted, and/or distributed properties of the blockchain data 148 can provide confidence in the reliability of the ledger or database of IoT events.

In step 227, the management service 120 can generate a summary of IoT events based on the IoT events recorded in a database or ledger of the blockchain data 148. For example, the user interface can identify a number of IoT events since a last visit, a number of IoT events in a particular time period, a number of IoT events per asset, and a number of IoT events per responsible entity. A total number of assets 115 can be identified, as well as a total number of IoT devices 113 or sensors. IoT events can also be separated according to event types, or specific events within each event type. Each IoT event can be shown, or a detailed view of the entire blockchain ledger can be shown.

Figure 3:
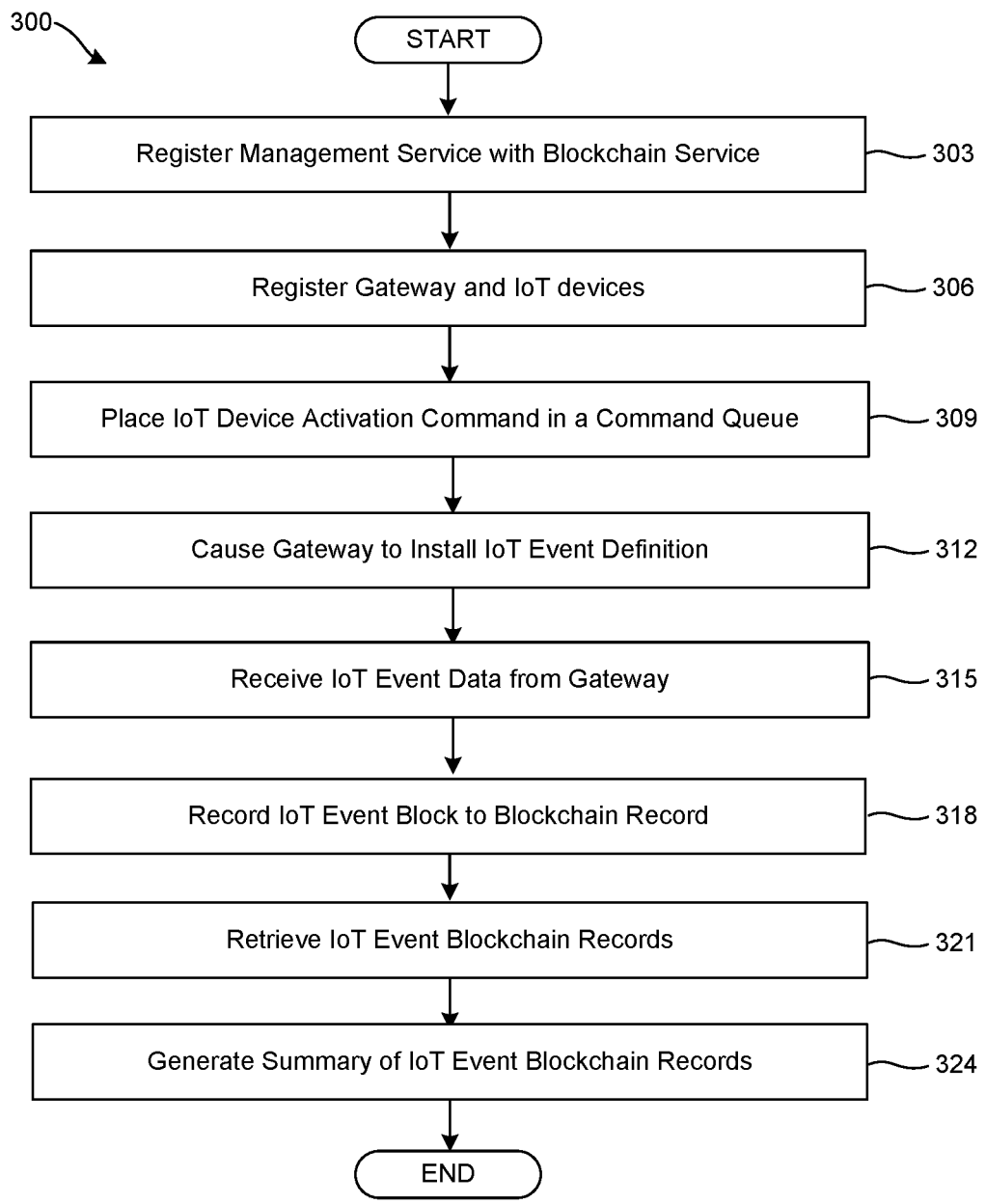
FIGS. 3 and 4 are flowcharts that illustrate functionality implemented by components of the networked environment.

FIG. 3 shows a flowchart 300 that illustrates functionality performed by components of the networked environment 100. Generally, this process enables the management service 120 to maintain reliable blockchain records for assets 115 associated with IoT devices 113. The management service 120 can also establish a trusted status with the gateways 111 as well as the blockchain service 140.

In step 303, the management service 120 can register the management service 120 with a blockchain service 140. As a part of registration, the management service 120 can provide the blockchain service 140 with access to a management certificate for the management serviced 120. For example, the management service 120 can authorize the blockchain service 140 to retrieve the management certificate from an identity provider. A blockchain certificate uniquely associated with the blockchain service 140 can be provided to the management service 120. The blockchain service 140 can permit management services 120 to write blocks to blockchains in the blockchain data 148 based on authentication using the management certificate. The management services 120 can authenticate connections to the blockchain service 140 using the blockchain certificate.

In step 306, the management service 120 can register or enroll the gateways 111 and IoT devices 113 with the management service 120. The management service 120 can receive a gateway identifier assigned by a manufacturer or otherwise uniquely associated with the gateway 111. The gateway 111 or a client device 109 can transmit the gateway identifier to the management service 120. The management service 120 can generate a gateway account and gateway account credentials for the gateway 111. The management service 120 can place a command to install gateway credentials in a command queue for the gateway 111. The management service 120 can receive an IoT device identifier for an IoT device 113 and can cause the IoT device 113 to be registered with the management service 120. The IoT device 113, gateway device 111, or client device 109 can transmit the IoT device identifier to the management service 120.

In step 309, the management service 120 can cause the gateway 111 to activate or enroll IoT devices 113. For example, the management service 120 can place at least one command associated with an activation schedule for one or more of the IoT devices 113 in a command queue of the gateway 111. The gateway 111 can check in with the management service 120, retrieve the command from the command queue provided by the management service 120, and implement the command using the gateway management application 159. In some cases, the commands can cause the gateway 111 to install a list of enrolled IoT devices 113.

In step 312, the management service 120 can cause an IoT event definition 128 to be installed in the gateway 111. For example, the management service 120 can place a command to install the IoT event definition 128 in a command queue for the gateway 111. The gateway management application 159 can check in and retrieve the command to install the IoT event definition 128. Once the command is retrieved, the gateway 111 can implement the command by installing or storing the IoT event definition 128 in the data store 153 of the gateway 111. The IoT event definition 128 can define an IoT event that is associated with a particular type of asset 115 or a group of assets 115. An IoT device 113 can be physically associated with an asset 115 of that asset type or group of assets. For example, the IoT device 113 can be attached to the asset 115 or attached to packaging of the asset 115. The management service 120 can also store metadata that associates the IoT device 113 with the asset 115.

The IoT event definition 128 can include a threshold value such as a threshold sensor value or a threshold time period. The IoT event definition 128 can define an IoT event based on a particular sensor being activated or a particular sensor value having a particular comparative relation with a threshold value or status. The threshold sensor values can be time-correlated, and the IoT event definition 128 can specify an IoT event including a particular comparative relation with a threshold value for a threshold period of time. Multiple sensors can be involved in an IoT event. The IoT event definition 128 can include a Boolean expression or relationship can be defined with states or thresholds for each of a plurality of IoT devices or sensors.

For example, IoT event definition 128 can specify that an event is when both a temperature value and a moisture value are exceeded or are exceeded for a threshold period of time. The IoT event definition 128 can also indicate an event when a threshold percentage of a total number of assets exceed a threshold value. For example, a shipment can include one hundred frozen products, each having an IoT device 113 attached. An IoT event can be defined where a particular threshold percentage, such as five percent of the assets have exceeded a particular threshold temperature. The IoT event definitions 128 can also include rules for temperature, moisture, barometric pressure, GPS or other geolocation, impact, force, velocity, azimuthal angle, elevation angle, infrared detection, radiation, biometrics, and other metrics, each of which can be time-correlated and can be considered alone and in conjunction with one another.

In step 315, the management service 120 can receive IoT event data 170 from the gateway. For example, the gateway 111 can generate a request to record event data 170 in a blockchain. The request can include sensor data 169 captured by IoT devices 113 and other event data 170. Sensor data 169 can be transmitted from an IoT device 113 to a gateway 111. The sensor data 169 can include data from one or more sensors of an IoT device 113. The sensor data 169 can include a sensor value and a type of sensor value. An identity of the IoT device 113 can also be included in the sensor data 169. The management service 120 can receive the request from the gateway 111. The management service 120 can maintain a log or table of event data 170, which can include the sensor data 169. The management service 120 can authenticate the request based on gateway credentials for the gateway 111. The management service 120 can also verify the request. For example, the management service 120 can be verify that the IoT event matches an event stored in the IoT event definitions 128 in the data store 123.

In some cases, the gateway 111 forwards sensor data 169 from the IoT device 113 to the management service 120. For example, the gateway can do so without generating event data 170 or determining that an IoT event has occurred. The management service 120 can analyze the sensor data 169 based on the IoT event definitions 128. In some cases, the sensor data 169 can indicate that a sensor of an IoT device 113 has triggered an IoT event based on the IoT event definitions 128. For example, the sensor data 169 can indicate a sensor value that is beyond a threshold value, or sensor values that are beyond a threshold value for a threshold period of time. If an IoT device 113 or IoT devices 113 have triggered an IoT event, the management service 120 can generate IoT event data 170. The event data 170 can include the sensor data 169, as well as a name or identity of the IoT event that is triggered. For example, the event data 170 can specify an event that changes or updates a responsible entity in metadata for the asset. The event data 170 can include an entity responsible for the asset 115. The entity can be an enterprise or an individual, internal division, department, or group within the enterprise. The management service 120 can determine the entity responsible for the asset 115, for example, based on metadata for the asset 115 stored in the data store 123.

In some cases, the management service 120 can also perform other actions in response to an event specified in the event data 170. A responsible entity can change based on an action such as scanning a barcode entering a pin or credential, digitally signing for, or otherwise accepting responsibility for the asset 115. An IoT event definition 128 can also define and cause a change of the responsible entity and update the metadata sin the data store 123. For example, the IoT event definition 128 can indicate that when the IoT device 113 detects a particular wireless network, then a particular entity is assigned responsibility for the asset 115 associated with the IoT device 113.

In step 318, the management service 120 can record an IoT event block to the blockchain data 148. The management service 120 can generate an IoT event block based on the event data 170. The IoT event block can be an encrypted block that describes the IoT event and includes the IoT event data 170. The management service 120 can update a blockchain in the blockchain data 148 to include the IoT event block. The blockchain service 140 can require the management service 120 to authenticate with the blockchain service 140 establish permission to write to the blockchain data 148. In some cases, the management service 120 can authenticate with the blockchain service 140 based on credentials that can include a username, password, file, token, or certificate. The blockchain service 140 can require a management service 120 to authenticate with the blockchain service 140 establish permission to write to the blockchain data 148. The management service 120 can authenticate with the blockchain service 140 based on credentials that can include a username, password, file, token, or certificate. For example, the blockchain service 140 can permit management services 120 to write blocks to blockchains in the blockchain data 148 based on authentication using the management certificate. The management certificate can be uniquely associated with a particular enterprise. In addition, the blockchain service 140 can store a table or other data that relates a particular management service 120 with a particular set of blockchains in the blockchain data 148. A particular management certificate can also be related with the particular management service 120 in the data. Blockchain service 140 can permit access to the particular set of blockchains based on the management certificate. The management services 120 can authenticate connections to the blockchain service 140 using the blockchain certificate. In some cases, the services can exchange certificates by transmitting the respective certificates during authentication.

In step 321, the management service 120 or multiple management services 120 can retrieve blockchain data 148 from the blockchain service 140. The blockchain service 140 can require a management service 120 to authenticate with the blockchain service 140 establish permission to access or retrieve the blockchain data 148. The blockchain service 140 can authorize number of management services 120 to access the blockchain data 148 based on the table or other data that relates a set of management services 120 to a set of blockchains in the blockchain data 148. A certificate can be stored in association with each management service 120. The management services 120 can also be associated with a particular asset 155 or group of assets 115. The asset 115 can correspond to a blockchain in the blockchain data 148. The management service 120 that retrieves the blockchain data 148 can be different from the management service that wrote a particular IoT event to the blockchain data 148. The properties of the blockchain data 148 can provide, for all management services 120 or enterprises that can access the blockchain, confidence in the reliability of the ledger or database of IoT events.

In step 324, the management service 120 can generate a summary of IoT events based on the IoT events recorded in a database or ledger of the blockchain data 148. For example, user interface can identify a number of IoT events since a last visit, a number of IoT events in a particular time period, a number of IoT events per asset, a number of IoT events per responsible entity. A total number of assets 115 can be identified, as well as a total number of IoT devices 113 or sensors. IoT events can also be separated according to event types, or specific events within each event type. Each IoT event can be shown, or a detailed view of the entire blockchain ledger can be shown.

Figure 4:
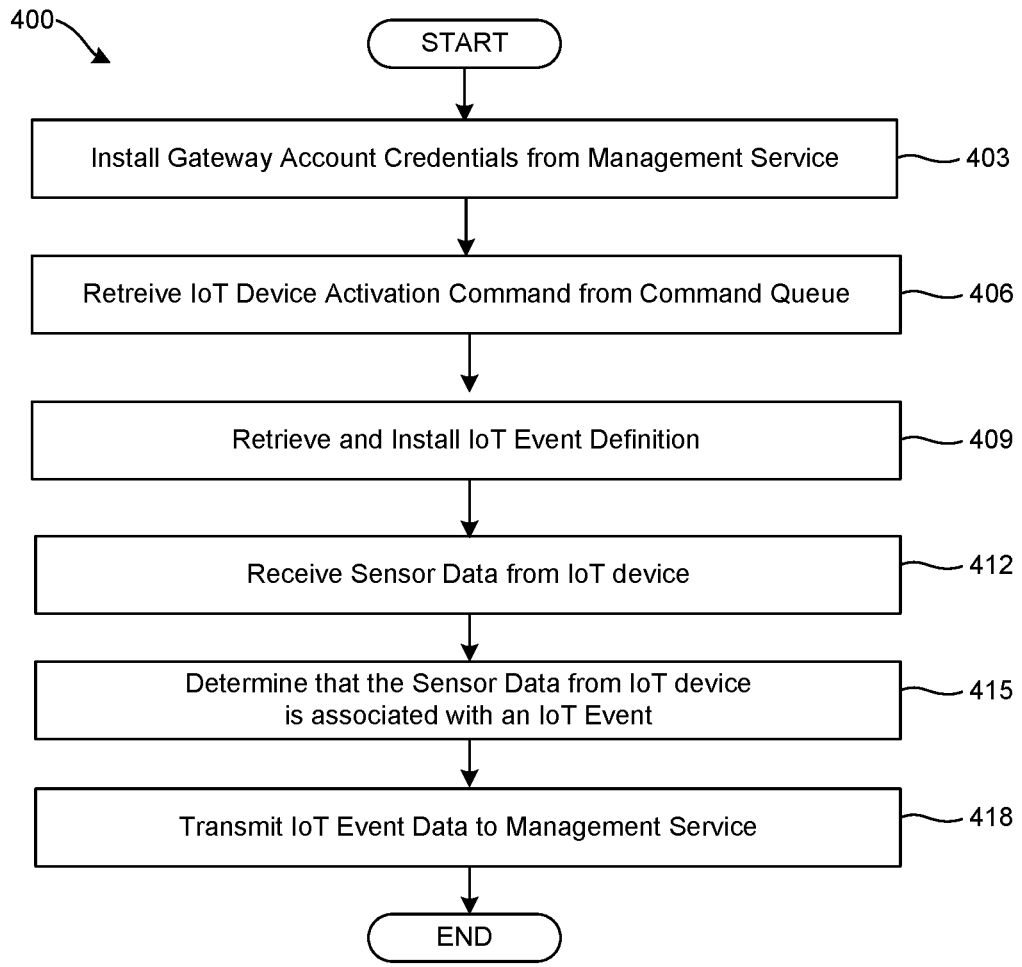

FIG. 4 shows a flowchart 400 that illustrates functionality performed by components of the networked environment 100. Generally, this process enables the gateway 111 to identify IoT events and request a management service 120 to record the IoT events to maintain reliable blockchain records for assets 115 associated with IoT devices 113. The gateway 111 can also establish a trusted status with the IoT devices 113 as well as the management service 120.

In step 403, the gateway management application 159 can install gateway account credentials from a management service 120. The gateway management application 159 can check in with the management service 120 and can retrieve a command to install the gateway credentials. The command to install the gateway credentials can include a network address or location to retrieve the gateway credentials. The gateway credentials can enable or permit communications with the management service 120. In some situations, gateway credentials are concealed from users or not provided to any user during the enrollment or registration process. The credentials can include one or more of a username, a password, an HMAC token, and/or a management certificate, for authentication. In some cases, a management certificate can be pre-installed to the gateway 111 during a manufacturing process.

In step 406, the gateway management application 159 can receive a command to activate an IoT device 113 from the management service 120. For example, the gateway management application 159 can retrieve the command to activate an IoT device 113 from a command queue for the gateway 111 that is maintained by the management service 120. The gateway management application 159 can implement the command. In some cases, the gateway management application 159 can store an IoT device identifier in a table or other data record that indicates that the IoT device 113 is enrolled with the management service 120. The gateway 111 can establish trust with the IoT device 113 by checking that the IoT device identifier or other credentials such as a username, password, token, or certificate is in a table, list, or database of enrolled and trusted IoT devices 113 to allow the IoT device 113 to provide sensor data 169 to the gateway 111 or to the management service 120, through the gateway 111. In some cases, the IoT device 113 can provide the IoT device identifier or other credentials such as a username, password, token, or certificate uniquely associated with the IoT device 113.

In step 409, the gateway management application 159 can retrieve an IoT event definition 128 from the management service 120 and install it on the gateway 111. For example, the management service 120 can place a command to install the IoT event definition 128 in a command queue for the gateway 111. The gateway management application 159 can check in and retrieve the command to install the IoT event definition 128. Once the command is retrieved, the gateway 111 can implement the command by installing or storing the IoT event definition 128 in the data store 153 of the gateway 111. The IoT event definition 128 can define an IoT event that is associated with a particular type of asset 115 or a group of assets 115. An IoT device 113 can be physically associated with an asset 115 of that asset type or group of assets. For example, the IoT device 113 can be attached to the asset or attached to packaging of the asset 115. The management service 120 can also store metadata that associates the IoT device 113 with the asset 115.

The IoT event definition 128 can include a threshold value such as a threshold sensor value or a threshold time period. The IoT event definition 128 can define an IoT event based on a particular sensor being activated or a particular sensor value being beyond a threshold. The threshold sensor values can be time-correlated, and the IoT event definition can specify an IoT event including a particular comparative relation with a threshold value for a threshold period of time. Multiple sensors can be involved in an IoT event. The IoT event definition 128 can include a Boolean expression or relationship can be defined with states or thresholds for each of a plurality of IoT devices or sensors. For example, the IoT event definition 128 can specify that an event is when both a temperature value and a moisture value are exceeded, or are exceeded for a threshold period of time. The IoT event definition 128 can also indicate an event when a threshold percentage of a total number of assets exceed a threshold value. For example, a shipment can include one hundred frozen products, each having an IoT device 113 attached. An IoT event can be defined where a particular threshold percentage, such as five percent of the assets have exceeded a particular threshold temperature. The IoT event definitions 128 can also include rules for temperature, moisture, barometric pressure, GPS or other geolocation, impact, force, velocity, azimuthal angle, elevation angle, infrared detection, radiation, biometrics, and other metrics, each of which can be time-correlated, and can be considered alone and in conjunction with one another.

In step 412, gateway management application 159 can receive sensor data 169 from an IoT device 113. The gateway 111 can verify that the IoT device 113 is registered or enrolled with the management service 120 based on data or a flag in the data store 153. The sensor data 169 can include data from one or more sensors of an IoT device 113. The sensor data 169 can also include data from one or more IoT devices 113. The sensor data 169 can include a sensor value and a type of sensor value. An identity of the IoT device 113 can also be included in the sensor data 169 and identified by the gateway 111. In some cases, the gateway 111 can maintain a log or table of sensor values, or can otherwise maintain or store at least a portion of the sensor data 169. The stored sensor data 169 can be used to identify IoT events that are defined in IoT event definitions 128.

In step 415, gateway management application 159 can determine that the sensor data 169 from the IoT device 113 is associated with an IoT event. The gateway management application 159 can analyze the sensor data 169 based on the IoT event definitions 128. Storing IoT event definitions 128 and analyzing sensor data 169 by the gateway 111 can result in reduced network traffic and reduced processing by the management service 120. The sensor data 169 can indicate that a sensor of an IoT device 113 has triggered an IoT event based on the IoT event definitions 128. For example, the sensor data 169 can indicate a sensor value that is beyond a threshold value, or sensor values that are beyond a threshold value for a threshold period of time. If an IoT device 113 or IoT devices 113 have triggered an IoT event, the gateway 111 can generate IoT event data 170.

The event data 170 can include the sensor data 169, as well as a name or identity of the IoT event that is triggered. The event data 170 can also include an entity responsible for the asset 115. The entity can be an enterprise or an individual, internal division, department, or group within the enterprise. The gateway 111 can determine the entity responsible for the asset 115, for example, based on metadata for the asset 115 stored by the gateway 111 or the management service 120. In some cases, the responsible entity can change based on an action such as scanning a barcode, entering a pin or credential, or digitally signing for, or otherwise accepting responsibility for, the asset 115. An IoT event definition 128 can also define and cause a change of the responsible entity and update the metadata stored by the gateway 111 or the management service 120. For example, the IoT event definition 128 can indicate that the asset 115 is within a geographic area associated with a particular entity, such as an enterprise or a department of an enterprise. In some examples, the gateway 111 forwards the sensor data 169 to the management service 120, and the management service 120 can determine that an IoT event has occurred based on the IoT event definitions 128, can generate the event data 170, and can update or record the event data to the blockchain.

In step 418, gateway management application 159 can transmit the event data 170 to the management service 120. For example, the gateway 111 can generate a request to record the event data 170 in a blockchain. The gateway management application 159 can transmit the request to the management service 120. The request can include the sensor data 169 and other event data 170. The management service 120 can authenticate the request based on gateway credentials for the gateway 111. The gateway credentials can also be included in the request. The management service 120 can be configured to authenticate and/or verify the request and record the event data 170 to the blockchain data 148 in response to authentication and/or verification of the request.

Figure 5:
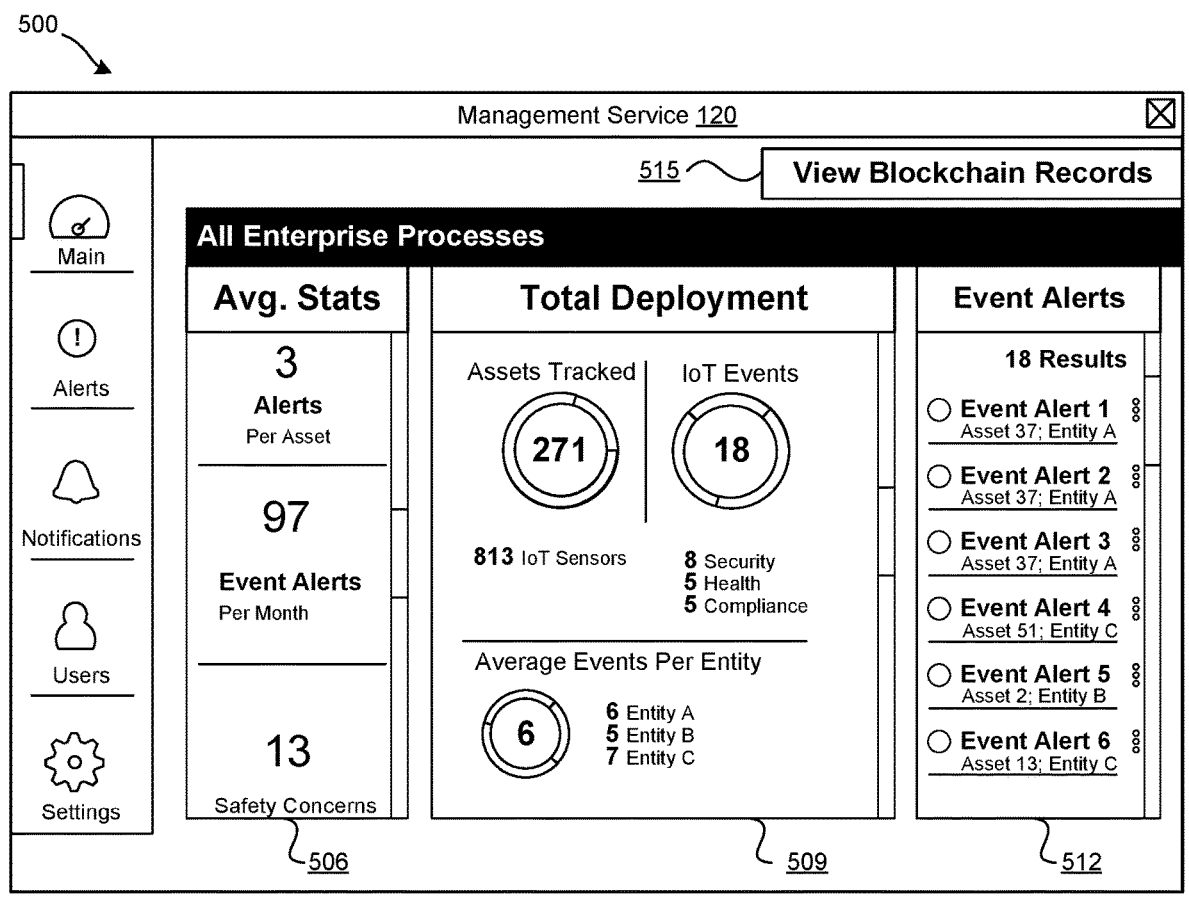
FIG. 5 is a drawing that illustrates functionality implemented by components of the networked environment and rendered for display.

FIG. 5 illustrates a user interface 500 of the management service 120 generated by the management service 120 and rendered for display, for example, on a display of the management service 120 or a client device 109. The user interface 500 can include a summary of IoT events generated based on the IoT events recorded in a database or ledger of the blockchain data 148.

The user interface 500 can include a user interface area 506, such as a pane or another type of user interface element. The user interface area 506 can include a number of alerts per asset 115. An IoT event defined in the IoT event definition 128 can include an alert, and the management service 120 can calculate, for a group of assets 115, a number of alerts per asset based on a total number of assets 115 and a total number of alerts. A ratio or alerts to assets can also be expressed as a ratio of assets to alerts. The user interface area 506 can also include a number of event alerts per month, or a number of IoT events of a particular category that occur in a particular time period or interval. The user interface area 506 can also include a total number of safety concerns or a total number of IoT events of any particular category of IoT event. The total number of IoT events in the category can be limited to IoT events currently in the category or a total number in a particular time period.

The user interface 500 can include a user interface area 509. The user interface area 509 can include a graphical representation of assets 115 being tracked. The graphical representation can represent a total number of assets 115 in a particular group of assets 115 and a total number of IoT devices 113 for the group of assets 115. The user interface area 509 can also include a graphical representation of IoT events according to category. In the example shown in the figure, IoT events include 14 security events, 12 health events, and 7 compliance events. The safety concerns in user interface area 506 can indicate a sum of two IoT event categories, security events and health events. Accordingly, IoT events can be assigned to a category as well as subcategories of the category. The user interface area 509 can also include an average number of events per entity. The management service 120 can identify whether events are caused by a certain entity. The entity can be the entity responsible for the asset 115 when the IoT event is recorded. The entity can be an enterprise, or a department or subdivision of the enterprise.

The user interface 500 can include a user interface area 512. The user interface area 512 can include a list of IoT events or alerts, and identify an asset 115 associated with each particular IoT event. The enterprise or entity responsible can also be identified for each IoT event. The user interface 500 can also include a user interface element 515. Once activated, the user interface elements 151 can cause a list of blockchains to be shown. The list of blockchains can be blockchains associated with the particular management service 120 in a table or other data of the blockchain service 140. The entire blockchain record, including all event data 170 in each block, can also be accessed.

The IoT devices 113, gateways 111, client devices 109, and devices including the management system 106 can include at least one processor circuit, for example, having a processor and at least one memory device, both of which couple to a local interface, respectively. The device can include, for example, at least one computer, a mobile device, smartphone, computing device, server device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 106 can include a display upon which user interfaces can be rendered. The IoT devices 113, gateways 111, client devices 109, and devices including the management system 106 can also include one or more input/output devices that can include, for example, a capacitive touchscreen or other type of touch input device, fingerprint reader, or keyboard.

Although the management service 120, gateway management application 159, gateway management application 159, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system comprising:
   a gateway device; and
   a data store comprising executable instructions which, when executed by a processor, cause the gateway device to at least:
   install an IoT event definition, the IoT event definition comprising a threshold value associated with an asset type;
   receive sensor data from an IoT device associated with the asset type;
   determine that the IoT device triggered an IoT event based on the sensor data and the IoT event definition, the sensor data indicating that the IoT device triggered the IoT event based on the threshold value; and
   transmit, to a management service, a request to record the IoT event to a blockchain, the request comprising the sensor data indicating that the IoT device triggered the IoT event, wherein the management service records a block to the blockchain, the block comprising the sensor data.

2. The system of claim 1, wherein the blockchain is hosted by a blockchain service that hosts the blockchain in a plurality of nodes external to the management service.

3. The system of claim 2, wherein the management service authenticates with the blockchain service based on a certificate uniquely associated with an enterprise.

4. The system of claim 1, wherein the executable instructions, when executed by the processor, further cause the gateway device to at least:
   retrieve the IoT event definition from a command queue for the gateway device, the command queue being stored by the management service.

5. The system of claim 1, wherein the executable instructions, when executed by the processor, further cause the gateway device to at least:
   generate IoT event data comprising the sensor data and metadata, the metadata identifying an entity responsible for a particular asset, wherein the particular asset is physically associated with the IoT device, and wherein the request to record the IoT event comprises the IoT event data.

6. The system of claim 1, wherein the gateway device comprises gateway credentials that are concealed from users during a gateway enrollment, and wherein the gateway device authenticates with the management service based on the gateway credentials.

7. The system of claim 1, wherein the IoT event definition specifies a threshold period of time to maintain a particular comparative relationship with the threshold value, and wherein the sensor data indicates that a sensor maintains the particular comparative relationship with the threshold value for the threshold period of time.

8. A non-transitory computer-readable medium embodying executable instructions which, when executed by a processor, cause a gateway device to at least:
   install an IoT event definition, the IoT event definition comprising a threshold value associated with an asset type;
   receive sensor data from an IoT device associated with the asset type;
   determine that the IoT device triggered an IoT event based on the sensor data and the IoT event definition, the sensor data indicating that the IoT device triggered the IoT event based on the threshold value; and
   transmit, to a management service, a request to record the IoT event to a blockchain, the request comprising the sensor data indicating that the IoT device triggered the IoT event, wherein the management service records a block to the blockchain, the block comprising the sensor data.

9. The non-transitory computer-readable medium of claim 8, wherein the blockchain is hosted by a blockchain service that hosts the blockchain in a plurality of nodes associated with a plurality of management services.

10. The non-transitory computer-readable medium of claim 8, wherein the management service authenticates with a blockchain service based on a certificate uniquely associated with an enterprise.

11. The non-transitory computer-readable medium of claim 8, wherein the executable instructions, when executed by the processor, further cause the gateway device to at least:
    retrieve the IoT event definition from a command queue for the gateway device, the command queue being stored by the management service.

12. The non-transitory computer-readable medium of claim 8, wherein the executable instructions, when executed by the processor, further cause the gateway device to at least:
    generate IoT event data comprising the sensor data and metadata, the metadata identifying an entity responsible for a particular asset, wherein the particular asset is physically associated with the IoT device, and wherein the request to record the IoT event comprises the IoT event data.

13. The non-transitory computer-readable medium of claim 8, wherein the gateway device comprises gateway credentials that are concealed from users during a gateway enrollment, and wherein the gateway device authenticates with the management service based on the gateway credentials.

14. A method performed by a gateway device, the method comprising:
    installing an IoT event definition, the IoT event definition comprising a threshold value associated with an asset type;
    receiving sensor data from an IoT device associated with the asset type;

determining that the IoT device triggered an IoT event based on the sensor data and the IoT event definition, the sensor data indicating that the IoT device triggered the IoT event based on the threshold value; and transmitting, to a management service, a request to record the IoT event to a blockchain, the request comprising the sensor data indicating that the IoT device triggered the IoT event, wherein the management service records a block to the blockchain, the block comprising the sensor data.

15. The method of claim 14, wherein the blockchain is hosted by a blockchain service that hosts the blockchain in a plurality of nodes external to the management service.

16. The method of claim 15, wherein the management service authenticates with the blockchain service based on a certificate uniquely associated with an enterprise.

17. The method of claim 14, further comprising:
retrieving the IoT event definition from a command queue for the gateway device, the command queue being stored by the management service.

18. The method of claim 14, further comprising:
generating IoT event data comprising the sensor data and metadata, the metadata identifying an entity responsible for a particular asset, wherein the particular asset is physically associated with the IoT device, and wherein the request to record the IoT event comprises the IoT event data.

19. The method of claim 14, wherein the gateway device comprises gateway credentials that are concealed from users during a gateway enrollment, and wherein the gateway device authenticates with the management service based on the gateway credentials.

20. The method of claim 14, wherein the IoT event definition specifies a threshold period of time to maintain a particular comparative relationship with the threshold value, and wherein the sensor data indicates that a sensor maintains the particular comparative relationship with the threshold value for the threshold period of time.

* * * * *